(12) United States Patent
Webb

(10) Patent No.: US 6,205,670 B1
(45) Date of Patent: Mar. 27, 2001

(54) BORE CENTERING DEVICE

(76) Inventor: James Webb, 3112 Kashiwa St., Torrance, CA (US) 90505

( * ) Notice: Subject to any disclaimer, the term of this patent is extended or adjusted under 35 U.S.C. 154(b) by 0 days.

(21) Appl. No.: 09/371,873

(22) Filed: Aug. 6, 1999

Related U.S. Application Data

(60) Provisional application No. 60/096,072, filed on Aug. 11, 1998.

(51) Int. Cl.[7] .................... G01C 9/26; G01B 3/00
(52) U.S. Cl. .................... 33/542; 33/354; 33/520; 33/544.4
(58) Field of Search .................... 33/286, 354, 370, 33/371, 379, 381, 382, 520, 529, 542, 544.4, 644, 671, DIG. 21

(56) References Cited

U.S. PATENT DOCUMENTS

| | | | |
|---|---|---|---|
| 2,484,801 | * 10/1949 | Anderson | 33/644 |
| 2,634,509 | * 4/1953 | Roberts | 33/381 |
| 2,761,215 | * 9/1956 | Macklanburg | 33/381 |
| 3,407,509 | * 10/1968 | Martinez | 33/520 |
| 3,755,905 | * 9/1973 | Blubaugh et al. | 33/286 |
| 4,993,160 | * 2/1991 | Fraley | 33/286 |
| 5,561,911 | * 10/1996 | Martin | 33/379 |
| 5,568,265 | * 10/1996 | Matthews | 33/286 |
| 5,655,309 | * 8/1997 | Hadrami | 33/371 |
| 5,815,937 | * 10/1998 | Glorioso, Jr. | 33/370 |
| 5,894,675 | * 4/1999 | Cericola | 33/DIG. 21 |

* cited by examiner

Primary Examiner—G. Bradley Bennett
(74) Attorney, Agent, or Firm—Roger A. Marrs

(57) ABSTRACT

A bore centering apparatus includes an elongated level having a laser beam generator at one end insertably received into the center of a centering cone placed within a hole in a wall. Adjustment of the level is made by turnbuckles which adjustably connect the level to the front face of the wall into which the centering cone is placed. The laser beam generator transmits a beam through the centering cone along its central longitudinal axis and therefore is coincident with the central longitudinal axis of the hole so that the beam terminates at a remote or spaced-apart intended target. Offset lines in degrees are carried on the external surface of the centering cone so that layout directions can be derived quickly. A protractor plate may be incorporated into the assembly at the base of the centering cone to set the desired degree of offset. By combining a 45 degree or 30 degree offset mark on the bore cone, the bore assembly is tilted accordingly to show compound angle layouts or directions of mechanical runs.

13 Claims, 2 Drawing Sheets

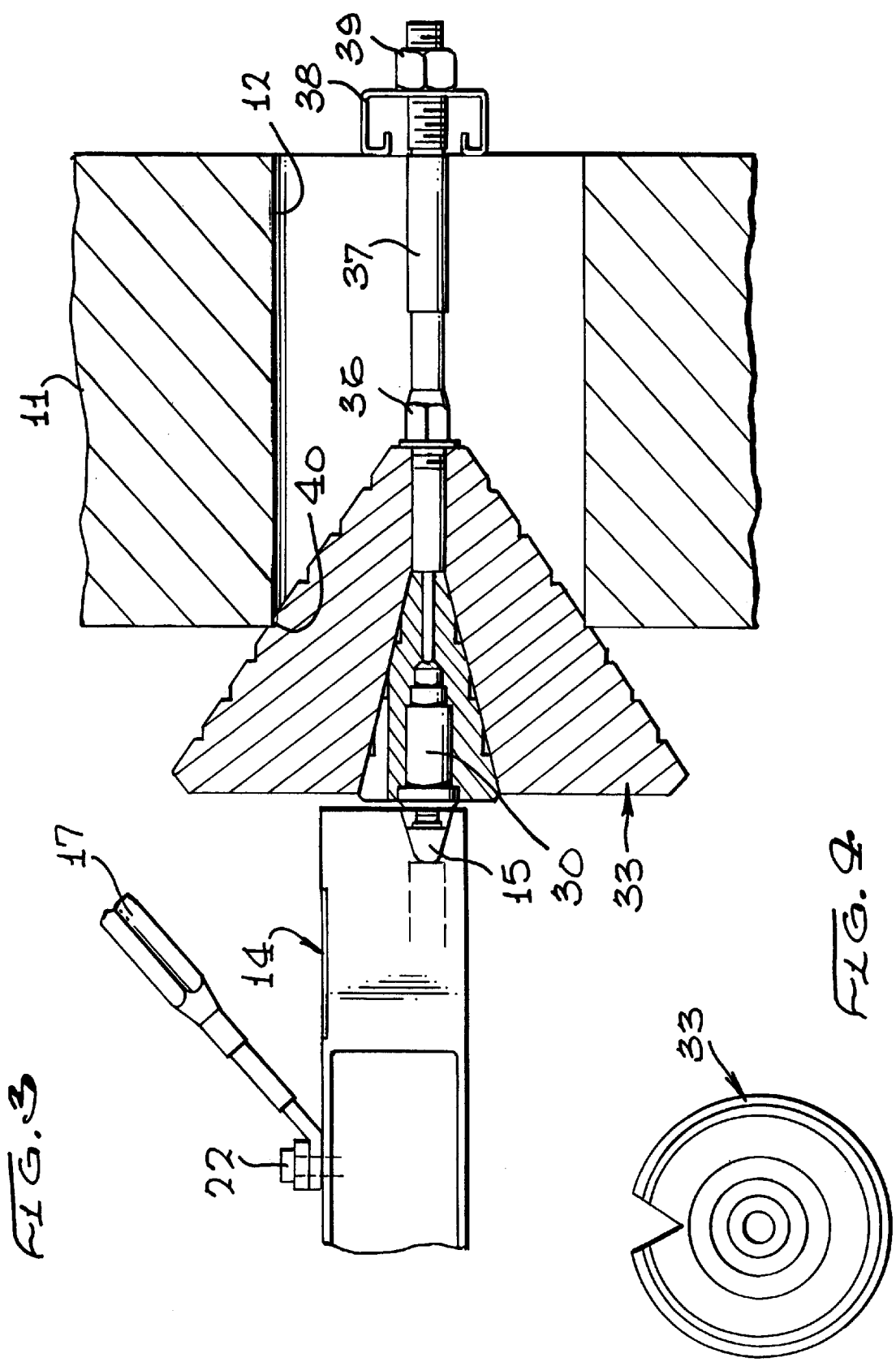

BORE CENTERING DEVICE

Priority claim based on provisional application No. 60/096,072 filed Aug. 11, 1998.

BACKGROUND OF THE INVENTION

1. Field of the Invention

The present invention relates to the field of bore centering apparatus, and more particularly to a novel bore centering device which allows straight transfer of centering points that are level or with a particular slope, pitch or grade consideration.

2. Brief Description of the Prior Art

In the past, it has been a difficult and labor intensive procedure to align the center axes of a bore with an intended target, such as a spot on a remote wall. Attempts have been made to locate the central axis of a bore or hole, such as in a wall, by installing a string length allowing the central axis of the bore and terminating the end of the string at the intended target. Other attempts have been made which require the use of optical equipment which is time-consuming and requires the expense of the equipment in order to perform the procedure. It is particularly difficult when it is required that a particular layout direction be quickly obtained and which direction may include a particular degree of offset. A particularly troublesome procedure involves the showing of compound angle layouts or directions of mechanical runs.

Therefore, a long-standing need has existed to provide a bore centering tool which may or may not involve application or sight offset angles in degrees and which provides that centering layout references can be accomplished by simply inserting a centering tool assembly into an open-ended hole and then employing a laser beam for sighting the directional layout desired. The laser provides a relatively inexpensive tool for generating and producing a beam directed to the intended target.

SUMMARY OF THE INVENTION

Accordingly, the above problems and difficulties are avoided by the present invention which provides a novel bore centering apparatus that includes an elongated level having a laser beam generator at one end which is insertably received into the center of a centering cone that is placed within the hole. Adjustment of the level is made via at least one or a pair of turn buckles which adjustably connect the level to the front face of the wall having the hole into which the centering cone is placed. The laser beam generator produces a beam which is extended through the centering cone along its central longitudinal axis and therefore is coincident with the central longitudinal axis of the hole so that the beam terminates at a remote or spaced-apart intended target. Offset lines in degrees are carried on the external surface of the centering cone so that layout directions can be given quickly at a glance. A protractor plate may be incorporated into the assembly at the base of the centering cone in order to set the desired degree of offset. By combining a 45 degree or a 30 degree offset marks on the bore cone, the bore assembly is tilted accordingly to show compound angle layouts or directions of mechanical runs.

Therefore, it is among the primary objects of the present invention to provide a novel bore centering tool which may be used in connection with construction roughends dealing with multiple joists or truss constructions, block wall corning applications or any layout transfer dealing with centering from a successive layout.

Still another object of the present invention is to provide a centering tool wherein the setup time is quick and simple and which allows straight transfer of centering points that are level and with a particular slope, pitch or grade consideration.

A further object of the invention resides in a bore centering tool employing a laser for producing a laser beam which is absolutely straight and will assure easy installation of any piping or mechanical run through the extended transfer of drill or core centers for hundreds of feet.

A further object resides in providing a bore centering tool which may include pre-marked degrees of offset lines on the external surface of a conical center cone and which may employ protractor plate to set the desired degree of offset so that combining the 45 degree or 30 degree offset marks on the bore conical cone and tilting the bore assembly, the compound angle layouts or directions of mechanical runs will be shown.

Still a further object resides in providing an adjustable means for centering a projecting laser beam through a hole which employs turn buckle means interconnecting the laser beam housing with the surface of the wall in which the hole is placed.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 3 is an enlarged sectional view of the bore centering assembly shown in FIGS. 1 and 2; and FIG. 4 is a front view of the conical cone used in the assembly shown in FIGS. 1–3 inclusive.

DESCRIPTION OF THE PREFERRED EMBODIMENT

Figure 1:
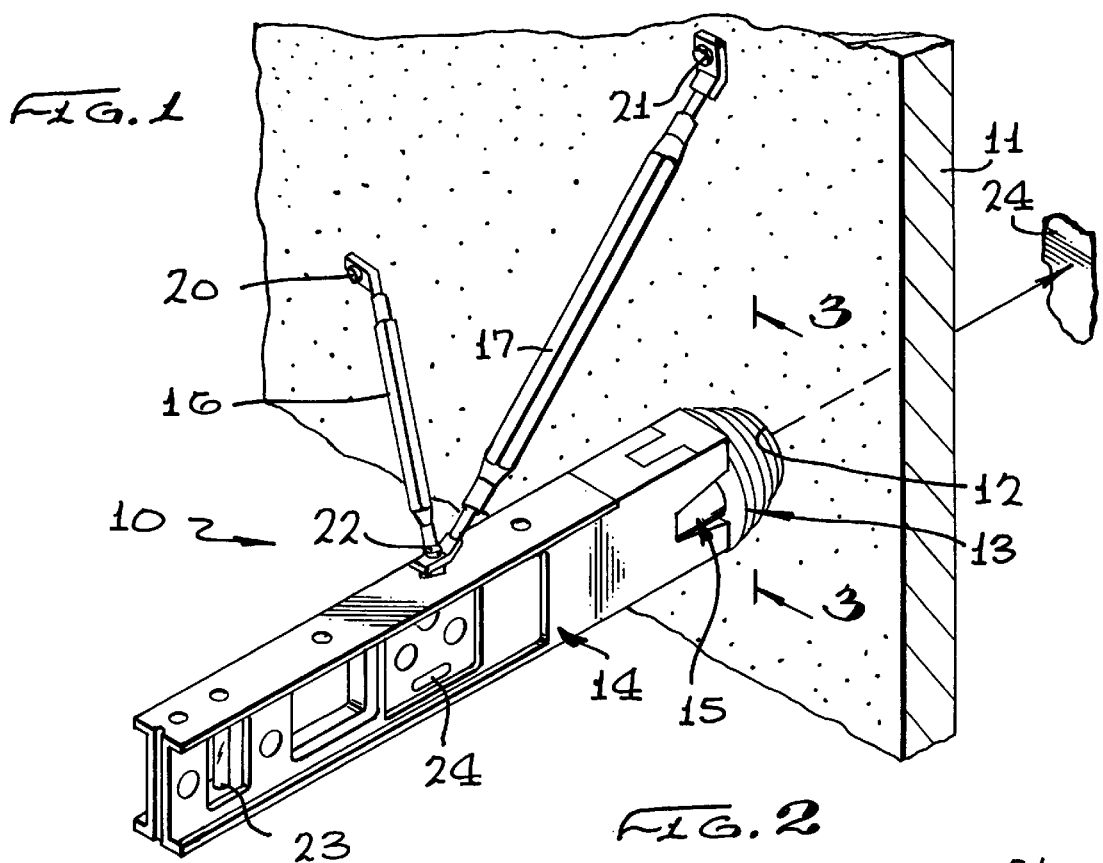
FIG. 1 is a perspective view illustrating the bore centering assembly of the present invention.

Referring to FIG. 1, the novel bore centering tool of the present apparatus is illustrated in the general direction of arrow 10 which is illustrated in a fully assembled condition. A wall 11 is provided with an open-ended hole 12 into which a centering cone 13 has been inserted. The back end of cone 13 is carried on the end of a level 14 having a laser beam generator 15 immediately behind the centering cone 13. The level and hence the laser generator 15 may be angularly adjusted by means of turn buckles 16 and 17. One end of each turn buckle is fixedly connected to the face of wall 11 by means of fasteners 20 and 21 while the opposite ends of the turn buckles are jointly secured to a pivot stud 22 carried on the top of the level 14. Therefore, by rotating the centerpiece of each of the turn buckles 16 and 17, the level and consequently the entire assembly may be adjusted for any offset angular layout that is desired. The level 14 also includes bubble levels, such as bubble capsule 23 and a horizontal bubble capsule 24. The laser beam produced by the generator 15 passes through the center of the cone 13 and can be aimed at an intended target 24. The cone 13 snugly fits in the hole 12 and in most cases, the beam from the laser will reside on the central longitudinal axis of the hole 12. By adjusting the turn buckles 16 and 17, offset or angular displacement can be arranged. At this point, "quickshot" centering layout references can be accomplished by simply inserting the tool assembly, including the cone 13, into any hole up to the diameter of the cone and sighting the directional layout desired.

For multiple layout transfer, the two turn buckles are adjusted. Preferably, one turn buckle is in line at a 45 degree angle and the other turn buckle is arranged to the side at 45 degrees. The turn buckle adjusters are pre-bent at the end to achieve easy adjustment. It is not imperative to have exact adjustment as the user will be able to adjust each to project exact layouts by simply turning the center portion of each turn buckle and watching the laser beam dot move accordingly as the lengths of the turn buckles are extended or shortened.

It is also easier if the user roughly sets the turn buckle lengths before attaching to a joist or truss. This is done by inserting the tool into the given bore diameter hole with the turn buckles not attached to the level 14. Hold up one of the turn buckle stays roughly simulating its position along the top of the level. Note the distance from the one quarter by 20 locating attachment hole and its distance from the stay that is at 45 degrees. The threads are left and right so it is easiest if the user then attaches the two stays to the level with a thumbnut connection. Now the user can hold the end of the stay that is unattached and turn the turn buckle body to adjust the length accordingly. It is not necessary to be exact at this point as the user will have plenty of adjustment after the user turns in the stays. The bubble vials or capsules can be employed to set a rough angle. Now the user sets the horizontal stay at its 45 degree angle to either side and at roughly the 45 degree angle matching the bends into the joist surface or truss until it is snug. The same procedure is now accomplished with the horizontal stay.

At this point, project the layout via the laser beam to the next location. Turn each turn buckle stay in or out to perfectly position the laser beam dot to the next or desired layout spot. It is recommended that for long multiple drilling sequences, the user physically lay out the second hole from given references and mark with a cross; then adjust the turn buckle stays until the laser dot hits the center. From here on you can simply drill and move to the next joist. The laser dot will obviously stay on center and continue to give a perfectly straight layout extension after each hole is drilled for as many joists or trusses as exist in line.

The same procedure will be useful when trying to extend a layout reference from one point to another at extended distances when no "common measurement" reference is available. The laser beam is very accurate since the beam is as straight and as flat as can be made possible. The boring sequence will be in perfect alignment with the user's reference first bore or as long as desired. Offsets are easily achieved by simply matching the preset 45 degree and 30 degree marks on the cone or bore head when adjusting the turn buckle stays. Since the cone 13 is tapered externally, a plurality of circular notches can be placed in spaced-apart relationship and it is intended that a selected notch will fit a desired hole 12. Therefore, the cone 13 can be placed into a particular hole of a given diameter and can be seeded properly so that the edge of the hole can reside within an associated circular slot or notch in the surface of the cone. The plurality of notches is illustrated in FIG. 1 and will be described later.

Figure 2:
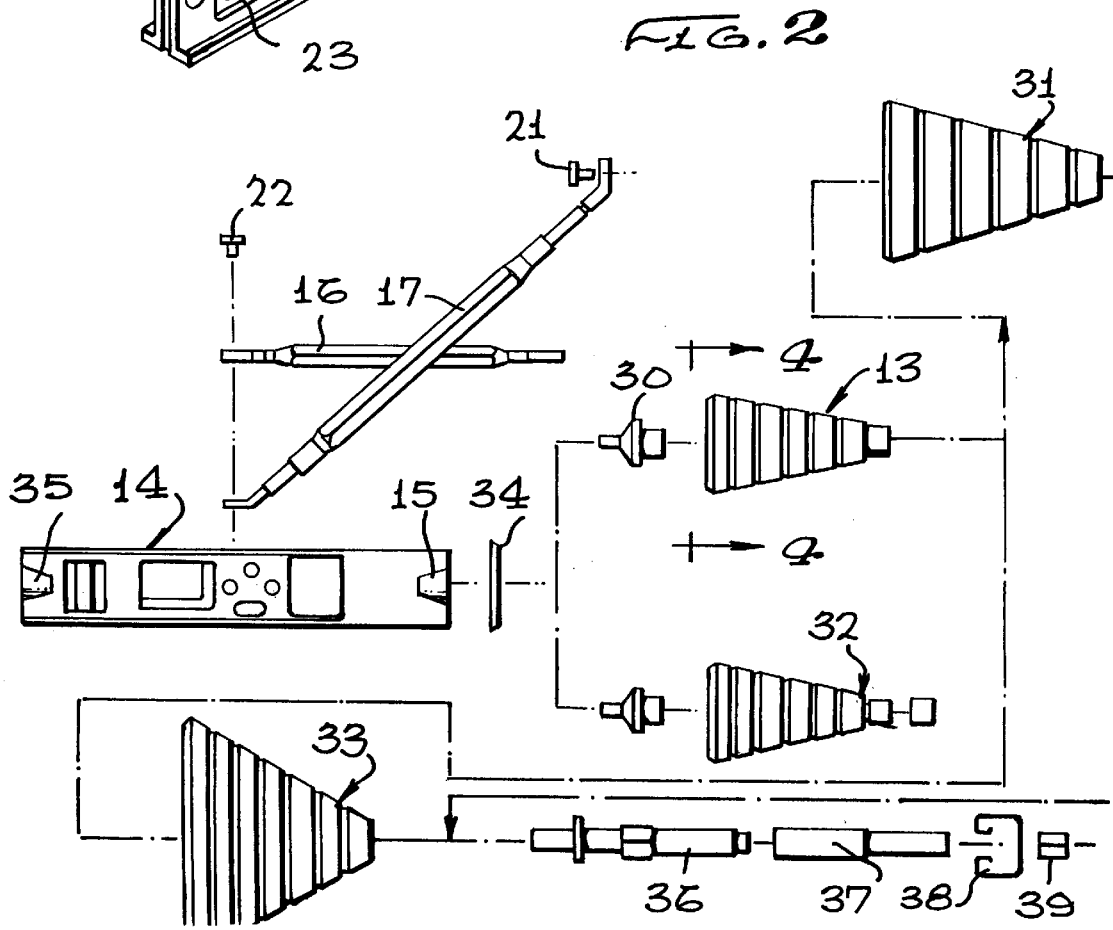
FIG. 2 is a diagrammatic layout of the component parts used in the bore centering assembly illustrated in FIG. 1.

Referring now in detail to FIG. 2, it can be seen that the level 14 includes the laser beam generator 15 and that a fitting 30 interconnects the end of level 14 and the laser generator with a selected one of bore cones, such as cone 13. However, it is to be understood that other diameter and geometrically shaped cones can be employed of different diameters, such as bore cone 31 and bore cone 32. If desired, the cones can be joined together and such a union is shown in broken lines. Cone 33 is of the largest diameter and may be joined with cone 31 which in turn may be joined with cone 13. Turn buckle 16 may be referred to as a horizontal turn buckle while turn buckle 17 is referred to as the vertical turn buckle.

By using the pre-marked 45 degree and 30 degree offset lines on the external surface of the bore cone, the user can quickly gain layout directions at a glance. The user of a protractor plate 34 to set the desired degree offset; then combine the 45 degree or 30 degree offset marks on the bore cone and tilt the bore assembly using the turn buckles 16 and 17 accordingly to show compound angle layouts or directions of mechanical runs. With the bore tool attached to the level 14, the two turn buckle adjusters as shown, preferable one in line up at a 45 degree angle and one to the at a 45 degree angle. The turn buckle adjustors are pre-bent at the end to achieve this orientation in an easy manner. The user has the ability to adjust each of the project exact layouts by simply turning each turn buckle and watching the laser beam dot move accordingly as the user lengthens or shortens the rods of the turn buckle.

It can also be understood that the level 14 may include a second laser beam generator 35 located at the opposite end from the end carrying generator 15. As such, the bore centering tool and assembly may be used as above with the beam generating from generator 35. In order to seat a bore cone properly in the hole 12, it can be seen that bore cone 33 includes shaft elements 36 and 37 which are joined together in combination with a clip 38 and a fastening nut 39.

To further illustrate the use of the bore centering assembly or device of the present invention, FIG. 3 shows that the bore cone 33 includes a plurality of concentric notches, such as notch 40, which are arranged in fixed spaced-apart relationship so as to coincide with a selected diameter of hole 12. It can be seen that the corner of the wall 11 fits into notch 40 since both are of the same diameter. Therefore, the fit is perfect. Next, it can be seen that the end of level 14 is attached to the fitting 30 and that the fitting 30 fits into a tapered bore within the center of cone 13. The cone 13 in turn, is inserted into a tapered bore within the bore cone 33. The bore cone 33 passes on the end of element 36 which in turn is coupled to the element 37 and terminates in a clip 38 which is secured by means of a threaded connection with nut 39. The clip 38 is an elongated channel which crosses the opening of the hole 12 and bears against opposite sides of the hole wall surface.

FIG. 4 illustrates the bore cone 33 to illustrate that it is circular and cone-shaped.

In view of the foregoing, it can be seen that the bore centering device or assembly of the present invention can be utilized with walls of any thickness and that standard turn buckle units can be employed in the locking or bolt-up point by using the special bore head attachment extensions, as shown. This is an excellent attachment system for coring as there is no need to set stays on a first wall unless adjustments are required for slope or grade.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. Bore centering apparatus comprising:

a level having opposite ends;

a conical member having a flat base with a tapering external surface extending from said base to an apex;

said conical member further including an open-ended bore extending from said base to said apex along a central longitudinal axis of said conical member;

an adapter disposed between a selected end of said level and said conical member; and adjustable braces attached to said level for placing a longitudinal central axis of said level in coextensive alignment with said bore longitudinal central axis.

2. The bore centering apparatus defined in claim 1 wherein:

said level includes a laser beam generator emitting a linear beam from said selected end; and said adapter having an open-ended conduit communicating with said conical member passageway whereby said linear beam projects through said adapter conduit and said conical member passageway.

3. The bore centering apparatus defined in claim 2 wherein:

said conical member passageway includes a tapered entrance recess; and said adapter includes a selected end conformal with and mateable with said tapered entrance recess.

4. The bore centering apparatus defined in claim 3 wherein:

said adjustable braces include turnbuckle devices for selectively lengthening and shortening said braces.

5. The bore centering apparatus defined in claim 1 including:

releasable securement means carried on said conical member and said means including a cross bracket and threaded bolt arrangement; and said level having a laser beam generator emitting a beam from an end of said level opposite to said level selected end.

6. Bore centering apparatus for allowing straight transfer of centering points that are level and with particular slope, pitch or grade consideration comprising:

an elongated level having opposite ends with a laser beam generator disposed at a selected end;

a centering cone having an open-ended passageway with an entrance for insertably receiving said selected end of said level;

said laser beam generator emitting a laser beam through said passageway; and adjustable brace means movably attached to said level for adjusting the direction of said laser beam through said passageway.

7. The bore centering apparatus defined in claim 6 wherein:

said laser beam is emitted through said passageway of said centering cone along its central longitudinal axis so as to be coincident therewith whereby said laser beam terminates at a remote target.

8. The bore centering apparatus defined in claim 7 wherein:

said centering cone includes an external tapered surface having a plurality of spaced-apart offset grooves in degrees so that layout directions can be observed.

9. The bore centering apparatus defined in claim 8 including:

a protractor plate disposed adjacent said centering cone to set a desired degree of offset.

10. The bore centering apparatus defined in claim 9 wherein:

said adjustable brace means includes an elongated turnbuckle having one end pivotally coupled to said level and adapted to be selectively lenghtened and shortened.

11. The bore centering apparatus defined in claim 10 wherein:

said centering cone is employed in combination with a wall having an open-ended passage;

said centering cone adapted to be inserted into said open-ended passage whereby said laser beam, said passageway central axis and a central longitudinal axis of said passage all reside in coaxial relationship.

12. The bore centering apparatus defined in claim 10 including:

an adapter device interposed between said level and said centering cone;

said adapter having opposite end engageable respectively with said level and said centering cone.

13. A bore centering apparatus comprising:

an elongated level having a laser beam generator at one end;

a centering cone having an open-ended passageway;

adjustment means connected to said level having at least one turnbuckle which adjustably connects said level to a front face of a wall having a hole for insertably receiving said centering cone;

said laser beam generator produces a beam emitted through said centering cone passageway along its central longitudinal axis and therefore is coincident with a central longitudinal axis of said hole so that said beam terminates at a remote intended target.

* * * * *